United States Patent [19]
Mott et al.

[11] Patent Number: 5,603,482
[45] Date of Patent: Feb. 18, 1997

[54] SOLENOID-OPERATED VALVE ASSEMBLY

[75] Inventors: Philip J. Mott; Mark E. Patton, both of Dryden, N.Y.; John R. Connolly, Rock Falls, Ill.

[73] Assignee: Borg-Warner Automotive, Inc., Sterling Heights, Mich.

[21] Appl. No.: 350,502

[22] Filed: Dec. 9, 1994

Related U.S. Application Data

[63] Continuation-in-part of Ser. No. 249,105, May 26, 1994, abandoned, which is a continuation-in-part of Ser. No. 173,442, Dec. 20, 1993, abandoned.

[51] Int. Cl.⁶ ................................................. F16K 31/06
[52] U.S. Cl. .................. 251/129.2; 251/129.15
[58] Field of Search .................. 251/129.01, 129.15, 251/129.21, 129.2; 137/625.65; 335/257, 255, 271, 276, 279, 277

[56] References Cited

U.S. PATENT DOCUMENTS

| | | |
|---|---|---|
| 3,528,639 | 9/1970 | Grayson . |
| 4,397,443 | 8/1983 | Watanabe et al. ............. 251/129.15 |
| 4,446,889 | 5/1984 | Sakakibara et al. ............ 251/129.16 X |
| 4,756,331 | 7/1988 | Stegmaier . |
| 4,783,047 | 11/1988 | Baltus et al. . |
| 4,893,652 | 1/1990 | Nogle et al. . |
| 4,905,545 | 3/1990 | Leising et al. . |
| 5,076,499 | 12/1991 | Cranford . |
| 5,118,077 | 6/1992 | Miller et al. . |
| 5,157,608 | 10/1992 | Sankpal et al. . |
| 5,300,908 | 4/1994 | Stone et al. ............ 335/257 X |

FOREIGN PATENT DOCUMENTS

| | | |
|---|---|---|
| 0203453 | 12/1986 | European Pat. Off. . |
| 0488262 | 6/1992 | European Pat. Off. . |
| 2180789 | 11/1975 | France . |

*Primary Examiner*—Kevin Lee
*Attorney, Agent, or Firm*—Brooks & Kushman; Greg Dziegielewski

[57] ABSTRACT

A solenoid valve mechanism including a valve housing with a vent port and a pressure supply port, a ball valve in a valve seat in said housing controlling pressure distribution to a control pressure passage from the supply port, a solenoid armature adapted to activate the ball valve, and a spring valve seat that cushions the operation of the valve mechanism when it is activated. Other mechanisms for reducing vibrations and noise of a solenoid valve mechanism include Belleville springs, O-rings, coil springs, foam cushions, and the like. The valve mechanism can be either normally applied or normally vented.

7 Claims, 10 Drawing Sheets

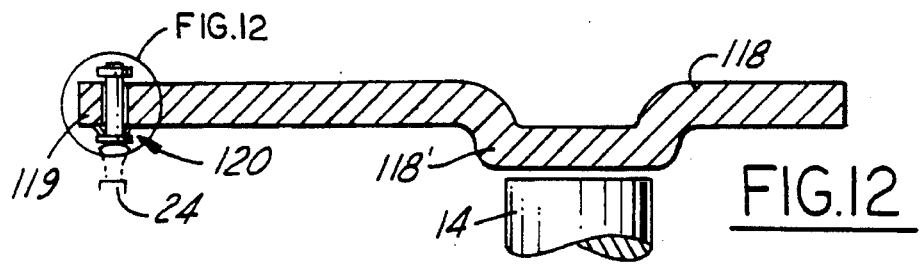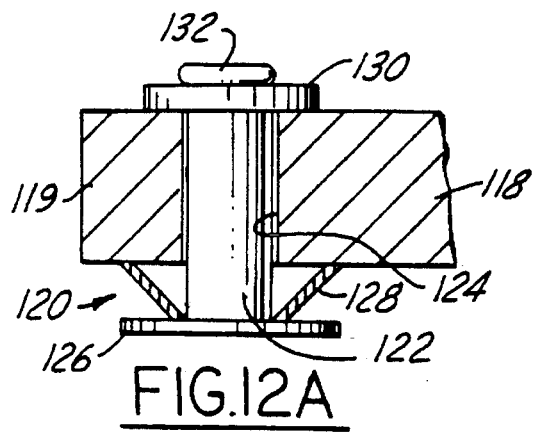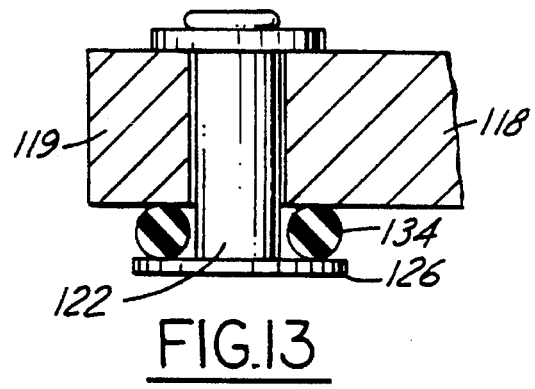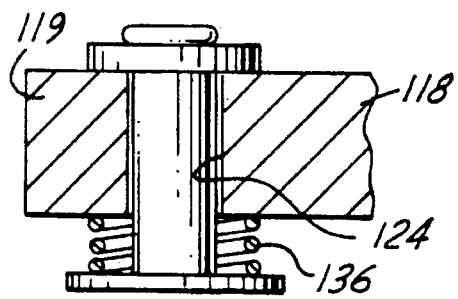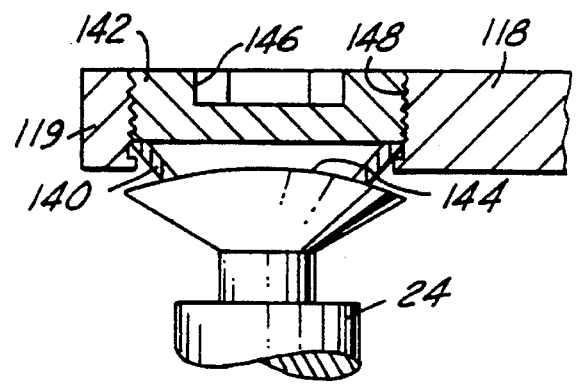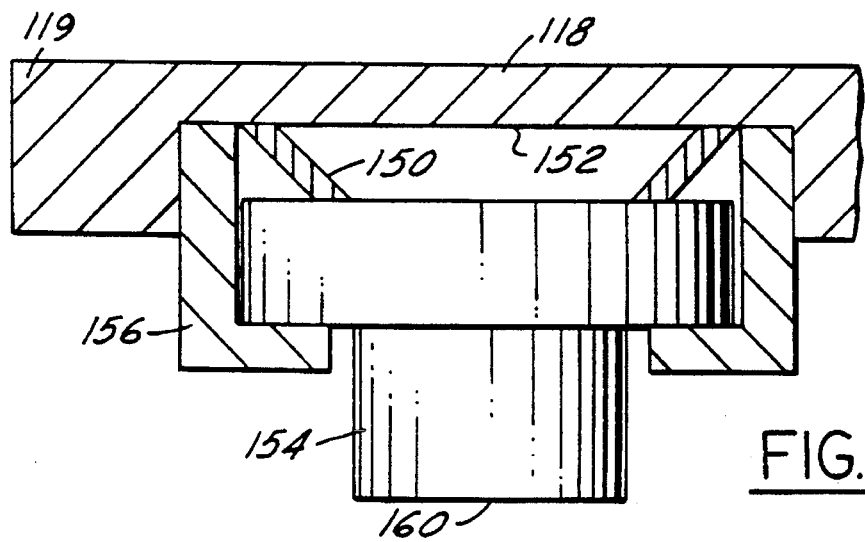

SOLENOID-OPERATED VALVE ASSEMBLY

CROSS-REFERENCE TO RELATED APPLICATIONS

This application is a continuation-in-part of U.S. patent application Ser. No. 8/249,105, filed May 26, 1994, now abandoned, which in turn is a continuation-in-part of U.S. patent application Ser. No. 08/173,442, filed Dec. 20, 1993 now abandoned.

TECHNICAL FIELD

This invention relates to solenoid-operated valve mechanisms particularly for controlling pressure in fluid pressure control systems.

BACKGROUND OF THE INVENTION

Solenoid-operated valve devices are in common use in numerous mechanisms and systems today. In particular, solenoid-operated valve devices are used in vehicle pressure regulators and the like.

The present invention is an improvement in solenoid-operated valve devices generally and more particularly relative to solenoid valve pressure regulators of the kind typically shown in U.S. Pat. No. 4,905,545. Regulators of the type disclosed in the '545 patent are adapted for use in a pressure control system for pressure-operated clutches and brakes of an automatic transmission in a vehicle driveline that includes an internal combustion engine with a throttle control.

A solenoid-operated pressure regulator of this type is also shown in U.S. Pat. No. 5,157,608 where the pressure regulator is used to establish a so-called throttle pressure, the magnitude of which depends upon the throttle setting of a throttle-controlled internal combustion engine.

It is desirable in an automatic transmission control system of this kind to regulate the clutch and brake apply pressure so that clutch or brake engagement is dependent upon the torque requirements that are required for a particular operating condition. As the engine throttle setting increases, the demand for torque increases, thereby making it necessary to increase the torque transmitting capacity of the clutch and brake friction elements.

The transmission system includes an enginedriven pump. In the case of the transmission system of the '545 patent, the outlet side of the pump supplies line pressure to a solenoid valve assembly that comprises a ball valve element situated in a pressure distribution passage, the outlet side of which communicates with a friction clutch or brake. A solenoid actuator, under the control of an electronic microprocessor, establishes an electromagnetic force on a solenoid armature which in turn triggers the operation of the ball valve element as a valve plunger engages and unseats the ball valve element.

The '545 patent describes both a normally vented solenoid valve assembly and a normally applied solenoid valve assembly. When the electromagnetic windings of the normally vented solenoid valve assembly of the '545 patent are de-energized, pressure in the supply pressure passage causes the ball valve element to seat against a valve seat that interrupts pressure distribution to the friction element. Simultaneously, a secondary valve element on the valve plunger becomes unseated as a flow passage is established between the pressure chamber for the friction element and the low pressure exhaust region of the circuit. When the solenoid is energized, the armature is moved, thus moving the plunger and the ball valve element and causing the ball valve element to become unseated from its valve seat. This permits pressure distribution from the line pressure passage to the friction element. Continued movement of the armature will cause the secondary valve element to become seated, thereby interrupting communication between the friction element and the vent.

In the system described in the '545 patent, the solenoid valve is a pulse-width modulated valve. During the portion of the cycle time for the solenoid in which the solenoid is energized, the secondary valve element moves toward its valve seat causing interruption of communication between the friction element and the vent as the ball valve element admits pressure from the supply pressure passage to the friction element. During the off time of the cycle, pressurized fluid flow from the supply pressure passage to the friction element is interrupted as the ball valve element seats on its valve seat which seals the supply pressure passage from the friction element. Simultaneously, the secondary valve element is unseated, thereby opening the friction element to the vent.

The rapid seating and unseating of the secondary valve element that occurs by reason of the cycling of the solenoid causes an undesirable valve vibration and noise. In the case of the normally applied solenoid valve assembly described in the '545 patent, the valve vibration and noise occurs as the ball valve element is seated and unseated.

The '545 patent describes one design attempt to alleviate this noise problem in a normally applied version of the solenoid valve assembly by providing a spring plunger that is engaged by the movable ball element as the solenoid is energized during the "on" portion of the cycle. The spring plunger acts as a damper as the movement of the ball valve element to its closed position is cushioned. During the "off" portion of the cycle, the spring of the spring plunger shifts the spring plunger into engagement with the ball valve element, causing the ball valve element to become unseated. As the ball valve element becomes unseated, flow once again is permitted to pass from the supply pressure passage to the friction element. This action is repeated as the solenoid windings are energized at a cycle frequency of approximately 50 pulses per second.

The device disclosed in U.S. Pat. No. 5,157,608 is a solenoid-operated ball valve arrangement that is used to establish a so-called throttle pressure in a control valve system of an automatic transmission. The solenoid valve assembly includes an armature that is spring loaded to cause a ball valve element to sealingly engage a port for supply pressure. When the solenoid windings of the actuator of the '608 patent are energized, the armature moves away from the ball valve element, thereby permitting the ball valve element to seat. This interrupts communication between the throttle pressure port and the exhaust port while increasing communication between the supply port and the throttle pressure port. By modulating the pulses for the solenoid windings, the effective pressure made available to the throttle pressure port can be controlled. No provision is made in the design of the '608 patent for preventing vibration and noise caused by the impacting of the ball valve element on its valve seat.

The cushioning arrangement described in the '545 patent involves a complex spring-loaded plunger and valve assembly that introduces manufacturing costs and complexity in the assembly procedure. It also requires careful calibration. An undesirable delay in the operation of the valve caused by the spring plunger adversely affects valve response time since the spring damping force is applied to the ball valve element before the ball valve seats in its valve seat during the "on" position of the solenoid energizing voltage cycle. Further, the cushioning arrangement includes moving valve parts that are sensitive to the presence of contaminants and changes in oil temperature.

SUMMARY OF THE INVENTION

It is an object of the present invention to provide solenoid-operated valve assemblies which are improvements over known valve assemblies. It is another object of the present invention to provide solenoid-operated valve assemblies which have reduced vibration and noise over known valve assemblies. It is a still further object of the present invention to provide normally vented and normally applied solenoid-operated pressure regulator assemblies which are improvements over known assemblies.

A normally vented version of the pressure regulator valve assembly of the invention comprises a simplified valve assembly that establishes control of fluid communication between a line pressure passage and the pressure chamber of a transmission clutch or brake and between the line pressure passage and a vent. It includes a ball valve element with a valve seated in a surrounding valve housing. Fluid flow may occur between the ball valve element and the valve cavity within the housing. A valve plunger actuated by a solenoid and solenoid armature of the valve assembly engages and unseats the ball valve when the solenoid is energized. As fluid is distributed from the high pressure region to the pressure chamber of the clutch or brake, a valve seat on the valve plunger is adapted to engage a flexible washer or a flexible disc assembly, the latter serving to seal the line pressure passage and to provide a flexible support for the valve plunger as the armature of the solenoid assembly provides valve actuating pulses for alternately seating the ball valve element and the valve plunger.

The flexible washer or disc assembly defines a flow control port in a vent passage. The port registers with the valve plunger to establish a cushioning action as the valve plunger seals the vent passage and interrupts communication between the friction element and the vent passage. By varying the duty cycle of the solenoid assembly, the effective pressure in the friction element or in other portions of the valve system can be controlled. As the ball valve element is moved from its valve seat, it provides communication between the friction element or other pressurized portion of the valve system and a pressure port in the line pressure passage.

An O-ring can also be utilized to cushion the sealing of the valve plunger against its valve seat in a normally vented solenoid-activated valve assembly.

A normally applied version of the regulator valve assembly of the invention includes a ball valve element and two ball valve seats. When the ball valve element is moved under line pressure into sealing engagement with one valve seat, communication between the pressure chamber of the clutch or brake and the vent is interrupted and communication between the line pressure passage and the pressure chamber is established. When the ball valve is moved into engagement with the other valve seat, line pressure distribution to the pressure chamber is interrupted and the pressure chamber communicates with the vent. The ball valve is moved into engagement with the other valve seat by a valve plunger that is actuated by the armature of a solenoid actuator.

The other valve seat is defined by a Belleville spring. After the ball valve element is sealed against its Belleville spring seat, the Belleville spring cushions the ball valve element.

The flexible valve seat in one embodiment of the normally applied version of the invention is a Belleville washer that is in contact at its outer margin with a relatively stationary portion of the valve assembly. The center of the Belleville washer is engaged by the ball valve element. Other embodiments of the normally applied version of our invention include a pair of Belleville washers arranged in side-by-side series relationship.

In contrast to the prior art teachings, both the normally applied and the normally vented versions of the solenoid valve assembly eliminate the noise and vibration problem associated usually with solenoid valve assemblies without adversely affecting the time of response of the valve assembly to the energizing voltage pluses. The cushioning action effected by the Belleville spring seat occurs after the ball valve element or the valve plunger, as the case may be, has engaged and sealed their respective valve seats.

The present invention also includes other mechanisms and devices to reduce the vibration and noise of solenoid-operated valve assemblies in normally applied and normally vented systems. Resilient means such as Belleville springs, O-rings, coil springs and the like can be attached to the end of the solenoid actuated armature to cushion the force of the armature striking or making contact with the valve plunger. In addition, a cushioning member such as foam can be used to cushion movement of the armature relative to the valve plunger. Further mechanisms for reducing vibration and noise include isolating the valve seats from the valve housing with resilient members and tapering the resilient members and mating chambers in the valve seat housings.

These and other benefits, features and advantages of the present invention will become apparent to persons of ordinary skill in the art when the following description is viewed in accordance with the attached drawings and appended claims.

BRIEF DESCRIPTION OF THE DRAWINGS

FIG. 12 illustrates a solenoid-activated armature which incorporates another embodiment of the present invention;

FIG. 12A is an enlarged view of the end of the armature shown in FIG. 12;

FIGS. 13–16 illustrate alternate forms of the inventive armature mechanism as shown in FIGS. 12–12A;

PARTICULAR DESCRIPTION OF THE INVENTION

Figure 1:
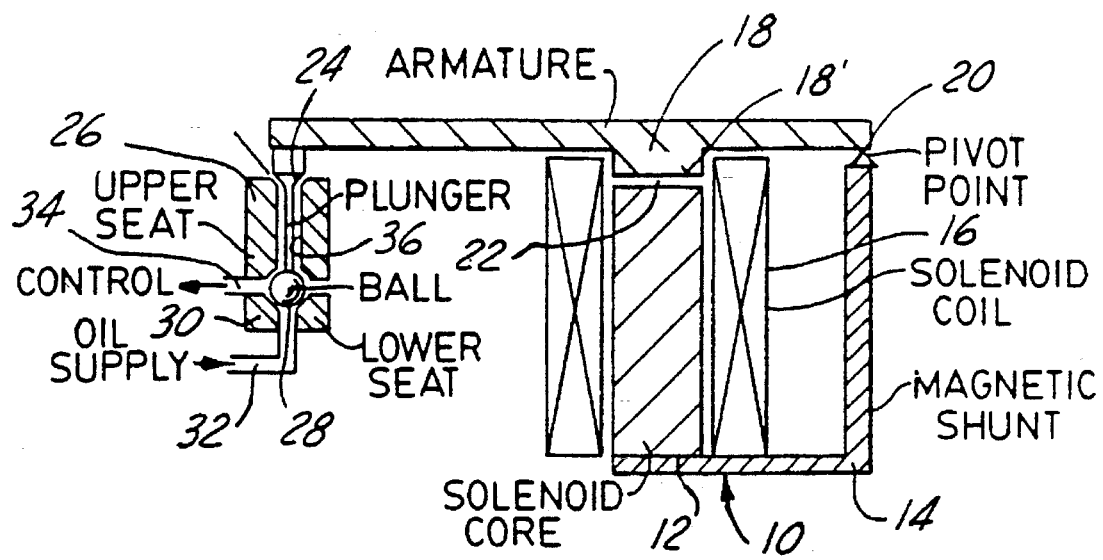
FIG. 1 shows in schematic form a normally applied solenoid valve pressure regulator.

In the schematic diagram of FIG. 1, a normally applied solenoid valve assembly is identified generally by reference character 10. It includes a solenoid core 12 located in a metallic housing identified in FIG. 1 as a magnetic shunt 14. Solenoid windings 16 surround the core 12. An armature 18 is pivoted at a pivot point 20 on the magnetic shunt 14. A cylindrical offset portion 18' on the armature 18 is arranged in alignment with solenoid core 12. An air gap 22 is located between the end of the core 12 and the offset portion 18'.

The free end of the armature 18 engages a plunger 24 that is received in an opening formed in an upper valve member 26. Plunger 24 is adapted to engage a ball valve element 28, which registers with a lower valve member 30. The armature is allowed to float upward until it engages a stop (not shown). When the solenoid is energized, the armature is pulled toward the core. This pushes the armature plunger onto the ball valve element and forces the ball valve element onto the lower seat. Line pressure oil supply passage 32 communicates with the lower valve seat as the ball valve element 28 controls communication between the passage 32 and control pressure passage 34, which may extend to a working chamber of a friction element such as a clutch or brake.

The ball valve element 28 is adapted also to register with the upper valve member 26 when the plunger 24 is moved upward as pressure acts on the ball valve element. Exhaust opening 36 thus becomes blocked, and communication between the friction element and the vent is interrupted.

Figure 6D:
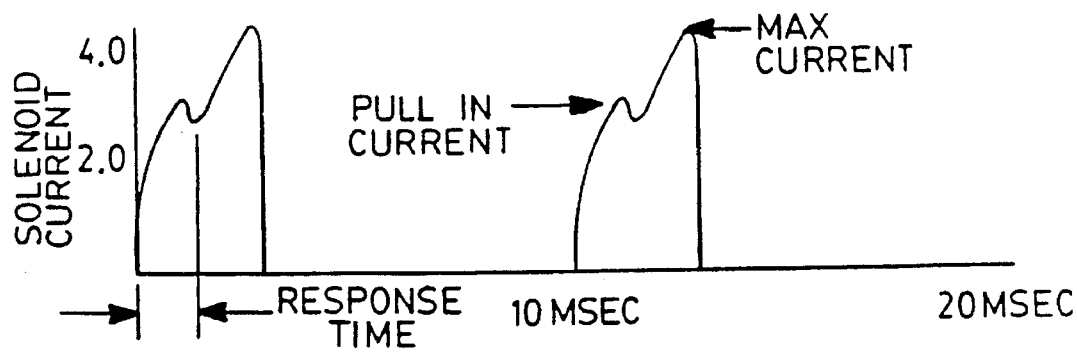
FIG. 6D is a graph showing the relationship of solenoid current pulses to time for the solenoid valve assembly.
Figure 6A:
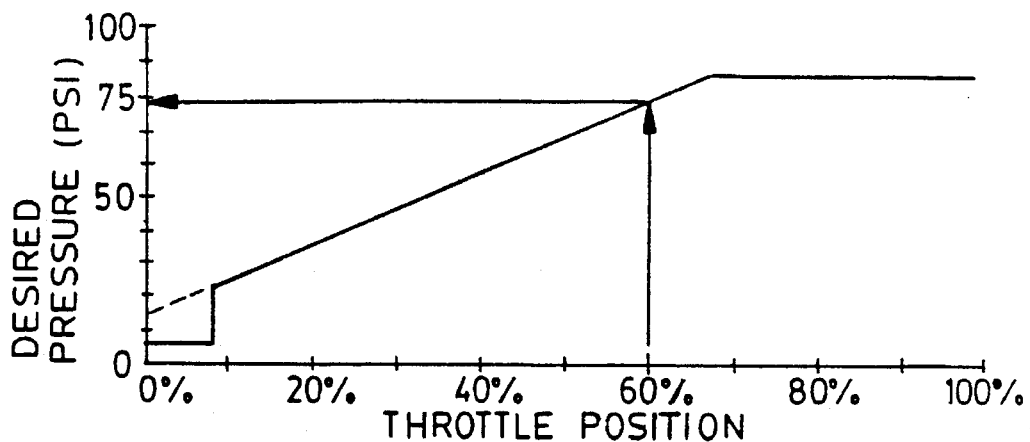
FIG. 6A is a graph that shows the relationship between engine throttle position and desired regulated pressure.

FIG. 6A illustrates the relationship between throttle position and a signal pressure. This is a function that is stored in the ROM portion of the memory of a microprocessor. For every throttle position, there is a resultant desired pressure output. As the vehicle operator advances the engine throttle, the corresponding desired pressure can be obtained by addressing the appropriate register in memory using a computer look-up table procedure.

Figure 6B:
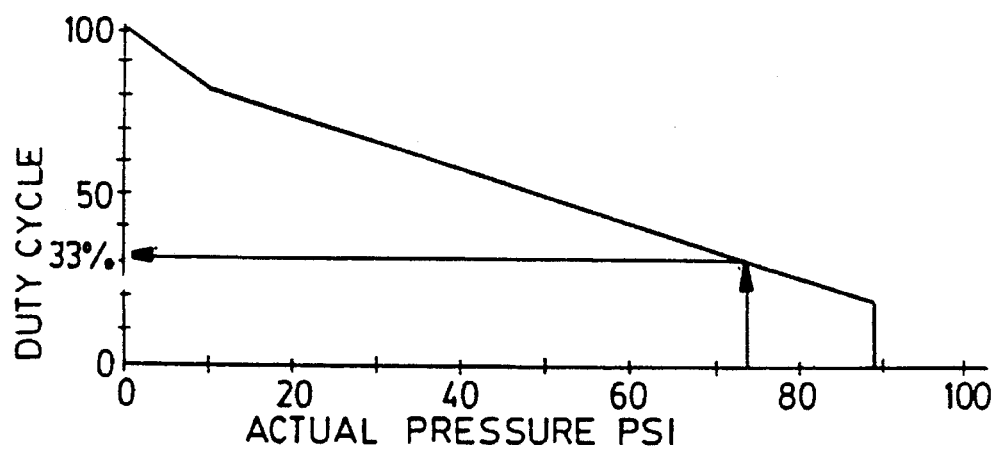
FIG. 6B is a graph that shows the relationship between regulated pressure and duty cycle.

In FIG. 6B, there is shown a plot of the pressure, determined from FIG. 6A, and the corresponding duty cycle that will produce that pressure. If, for example, the throttle position in FIG. 6A is 60 percent of the wide-open throttle position, the desired pressure may be approximately 75 psi. That pressure value then is used as shown in FIG. 6B to obtain a duty cycle of 33 percent. As in the case of FIG. 6A, the functional relationship shown in FIG. 6B is a function stored in ROM.

Figure 6C:
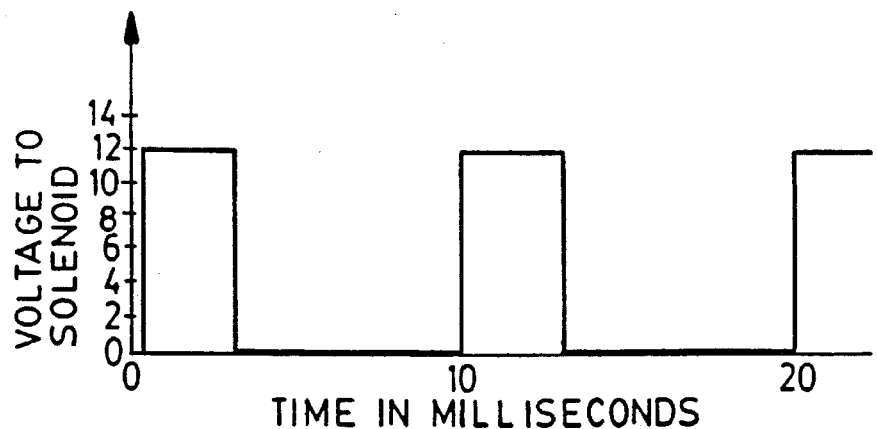
FIG. 6C is a voltage graph showing the waveform for the voltage signal made available to the solenoid windings of the solenoid valve mechanism.

The computer then commands a 33 percent duty cycle for the solenoid driver circuit. This relationship is shown in FIG. 6C where voltage to the solenoid windings is plotted against time. In the plot of FIG. 6C, the solenoid "on" time is 33 percent, and the solenoid "off" time is 67 percent.

FIG. 6D shows a plot of the solenoid current against time. At the left side of the plot of FIG. 6D, the solenoid current is seen to rise rapidly to a peak value indicated by the legend "Max Current". As full voltage is applied to the solenoid, the current builds up to an intermediate value, "Pull In Current", during a so-called "Response Time" which is the elapsed time from voltage application to armature motion. The typical notch in the current trace labeled "Pull In Current" usually indicates some movement of the solenoid armature producing back-EMF and thus a momentary variation in the measured current. Once the solenoid armature has moved, current continues to rise toward a peak value indicated by the legend "Max Current". During the "Off Time" of the cycle, the current falls to zero value before repeating the cycle as full voltage is applied once again.

It has been observed that with normally applied solenoid valve mechanisms of this kind, a primary source of noise is the result of the ball valve element engaging the valve seat. In order to cushion the ball valve element, a Belleville spring element is used to seat the ball valve element rather than a solid valve seat. The ball valve seats on the Belleville spring with the inside diameter of the spring acting as a sealing surface. This produces a significant reduction in the peak impact forces and a corresponding reduction in noise.

Figure 2:
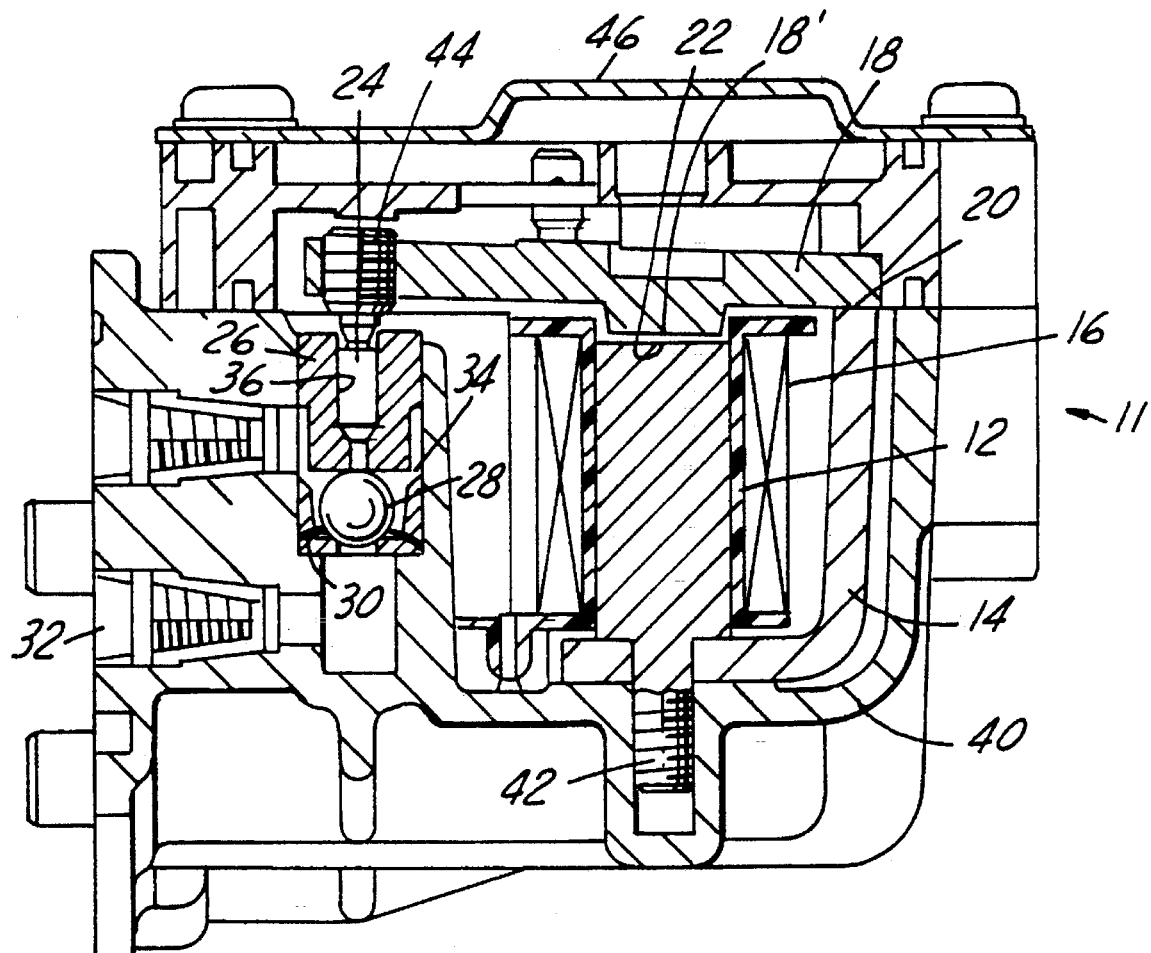
FIG. 2 is a cross-sectional assembly view of an improved solenoid valve assembly of the kind schematically illustrated in FIG. 1.

A preferred embodiment of a normally applied version of our invention is illustrated in FIG. 2. The numerals used in FIG. 2 correspond to the numerals used in FIG. 1 for corresponding elements. A housing 40 encloses the magnetic shunt 14. The core 12 has a threaded extension 42 that is received in a threaded opening in the housing 40. The shunt 14 is secured in place by the threaded connection.

The right-hand end of the armature 18 carries an adjustment screw 44 that is adapted to contact the end of valve plunger 24. The opposite end of the valve plunger engages ball 28. A cover 46 which may be secured to the housing 40 by bolts, encloses the solenoid valve assembly and the valve as well as the armature.

Figure 3:
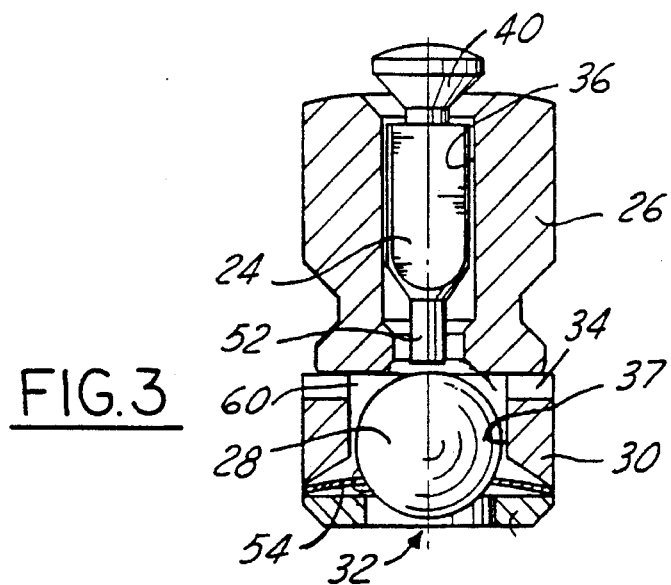
FIG. 3 is a detailed cross-sectional view of the ball valve element of the assembly shown in FIG. 2.

FIG. 3 shows in particular detail the structure of the solenoid ball valve and the ball valve seats for the normally applied version of our invention. The upper valve member 26 has an opening 36, as mentioned previously, within which the plunger 24 is slidably positioned. The lower end of the plunger 24 shown at 52 is adapted to engage the ball valve element 28, the latter being seated on Belleville spring seat 54 secured at its margin between the lower valve member 30 and lower spacer washer 56. The center of the washer 54 forms a valve opening that is sealed by the ball valve element when the plunger 24 is moved downwardly by the armature 18. The ball valve element seats on valve seat 60 when the solenoid current is zero, thus connecting passage 34 with passage 32 and sealing vent opening 36.

Figures 4A, 4B:
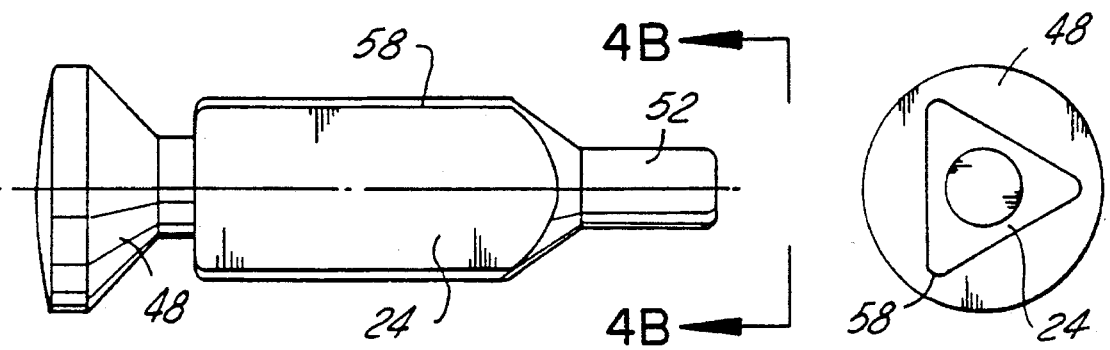
FIG. 4A is a detailed view of the plunger that registers with the ball valve element of FIG. 3.
FIG. 4B is an end view seen from the plane of section line 4B—4B of FIG. 4A of the plunger illustrated in FIG. 4A.

The plunger is shown in more detail in FIGS. 4A and 4B. It includes fluted sides 58 which slidably engage the sides of the opening 36 so that the plunger is guided as it moves toward and away from the ball valve element. The opening 36 is in communication with the exhaust region through the open end of opening 36 adjacent which the conical valve surface 48 of the plunger.

The ball valve element 28 is smaller than the opening 37 in the valve member 30 so that an open flow path around the ball is provided during operation. Close tolerance for the clearance between ball valve element and member 30 thus is not required.

When the solenoid is energized, the ball is moved into registry with the seat provided by the flexible washer 54. When the solenoid is deenergized, the ball is moved off the seat, thereby permitting communication to occur between passages 32 and 34.

The ball valve element moves between the valve seat formed by the spring 54 and the valve seat 60 formed on the upper valve seat 26 as the solenoid coils are subjected to the voltage pulses indicated in FIG. 6C. By appropriately controlling the timing of the pulses in the manner previously described, an effective control of the pressure in the passage 34 can be achieved. The pressure level then is maintained at a desired pressure level between the pressure of the passage 32 and the pressure of the exhaust region. The cushion provided by the Belleville spring reduces the impact forces, thereby reducing the sound that otherwise would be developed if the ball were to impact a solid valve seat, as in the case of prior art systems.

Figure 5A:
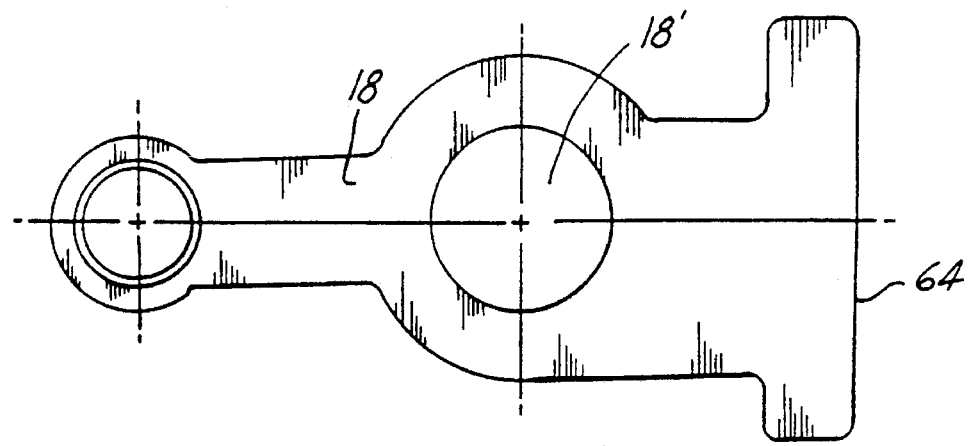
FIG. 5A is a plan view of the armature for the solenoid valve assembly shown in FIG. 3.
Figure 5B:
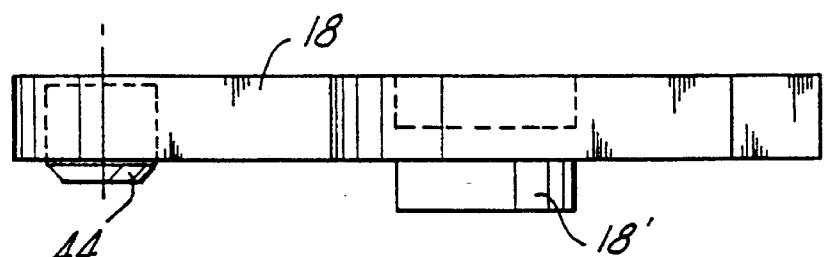
FIG. 5B is a side view of the armature of FIG. 5A.

In FIG. 5A, a plan view of the armature 18 is shown. The right-hand end 64 of the armature 18 is pivoted on the magnetic shunt 14. As seen in FIG. 5B, the thickness of the armature 18 is relatively constant from the pivot end 64 to the plunger and the adjustment nut 44.

Figure 5C:
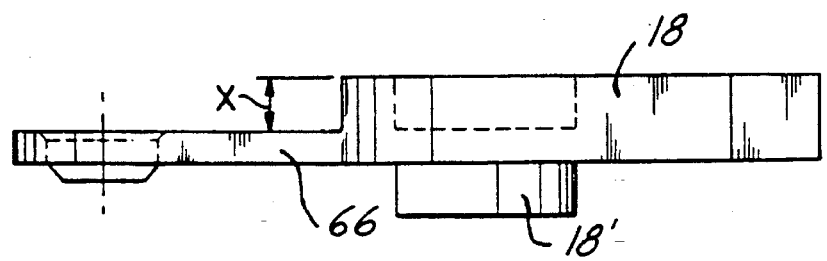
FIG. 5C is an alternate embodiment of the armature shown in FIGS. 5A and 5B.

FIG. 5C depicts an alternate design for the armature. It includes a reduced thickness section 66 which substantially reduces the mass of the overall armature. The amount of reduction X is about 0.11–0.15 inches. This reduces the weight or mass of the armature by approximately 5.0–6.0 grams. This design reduces the dynamic system mass without affecting the magnetic path through which it operates.

Figure 5D:
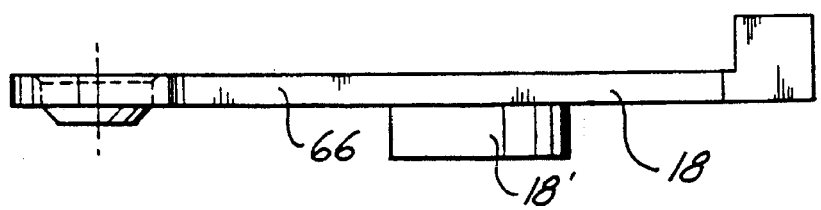
FIG. 5D is a second alternate embodiment of the armature shown in FIGS. 5A and 5B.

FIG. 5D shows a second alternate embodiment for the armature design in which the mass of the armature is reduced even further by reducing its thickness throughout the entire length of the armature. The thickness reduction of 0.11–0.15 inches is extended over the entire armature. This reduces the weight of a conventional armature approximately 14 grams which is about 45% of its mass. This design changes not only the dynamic system mass, but also affects the magnetic path of the system.

The reduced mass alternative designs shown in FIGS. 5C and 5D have lower inertia, thereby reducing the impact energy as the ball valve element engages its valve seat. This produces lower noise levels while at the same time maintains adequate strength and material volume to allow normal operation of the solenoid and valve mechanism. These designs can be used in combination with the Belleville spring and other resilient member mechanisms described herein or can be used as alternatives thereto.

Figure 7:
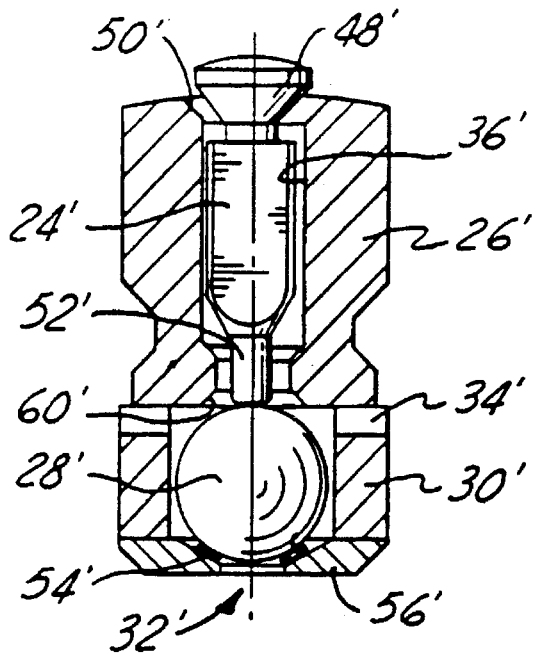
FIGS. 7, 8 and 9 show alternate embodiments of the normally applied ball valve element in accordance with one embodiment of the present invention.

An alternate spring seat design is shown in FIG. 7. The spring, shown at 54', has a cone shape, and it surrounds the port at supply passage 32'. As the spring 54' is engaged by the ball 28', it flexes as it seals the passage 32'.

Figure 8:
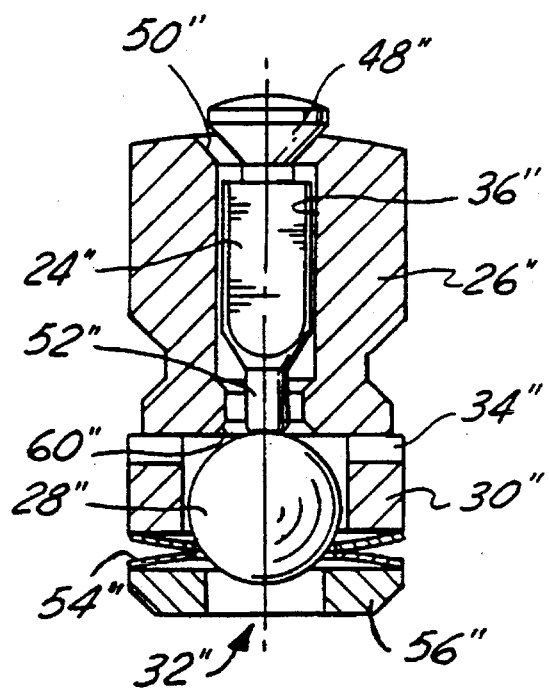

Another alternate spring seat design is shown in FIG. 8. This design has two Belleville type spring washers 54" arranged in stacked relationship with their outer margins in contact with the lower seat 30" and the lower washer 56".

Figure 9:
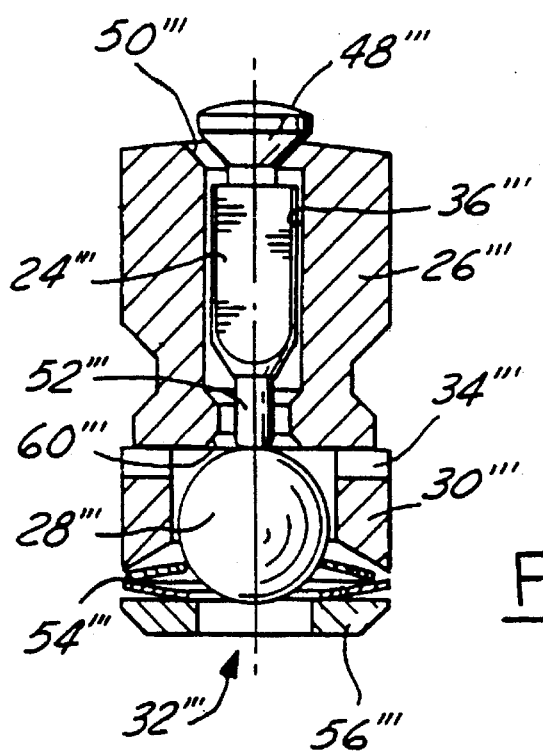

FIG. 9 shows still another spring seat design. It comprises a pair of Belleville type spring washers 54''' arranged in back-to-back, stacked, series relationship as in the case of the design of FIG. 8. It differs from the design of FIG. 8, however, because the inner margins of the washers 54''' are separated while their outer margins are in contact, one with respect to the other.

The numerals used to designate the elements of FIGS. 7, 8 and 9 are the same as the numerals used to designate corresponding elements in the design of FIG. 3, although prime, double prime and triple prime notations, respectively, are added.

Figure 10:
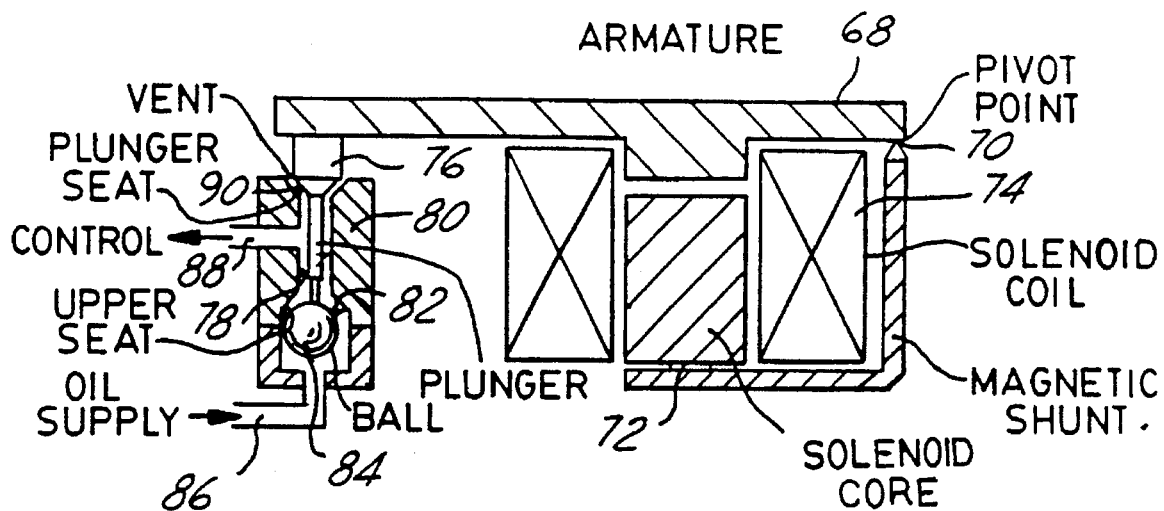
FIG. 10 is a schematic representation of a normally vented solenoid valve assembly capable of embodying the improvements of the present invention.

In FIG. 10, we have shown in schematic form a normally vented solenoid valve assembly. As in the case of the normally applied solenoid valve assembly, the valve assembly of FIG. 10 includes a solenoid armature 68 pivoted at 70 on a magnetic shunt to which is connected a solenoid core 72. Solenoid windings 74 apply an electromagnetic force to the armature 68 when the solenoid windings are energized. This exerts a downward force on valve plunger 76 situated in a pressure passage 78 formed in valve body 80. A valve seat 82 is adapted to register with ball valve element 84 when the armature moves upward. The ball valve element 84 seats under line pressure supplied to the valve assembly through oil supply 86.

In the "OFF" state, the ball moves onto the upper valve seat, and supply oil thus is cut off from the pressure passage 88 leading to the pressure chamber of the clutch or brake. The valve plunger 76 has a conical valve surface 90 which registers with a conical valve seat in the housing 80. When the plunger is in the position shown in FIG. 10, passage 88 is vented through the vent port provided by the conical seat for the surface 90.

In the "ON" state of the solenoid valve assembly, the armature end pushes the plunger onto the ball and forces the ball off of the valve seat 82, thus supplying pressurized oil to passage 88. Continued movement of the plunger will allow the plunger 76 to seal in the seat for surface 90, thereby interrupting communication between the passage 88 and the vent.

Figure 11:
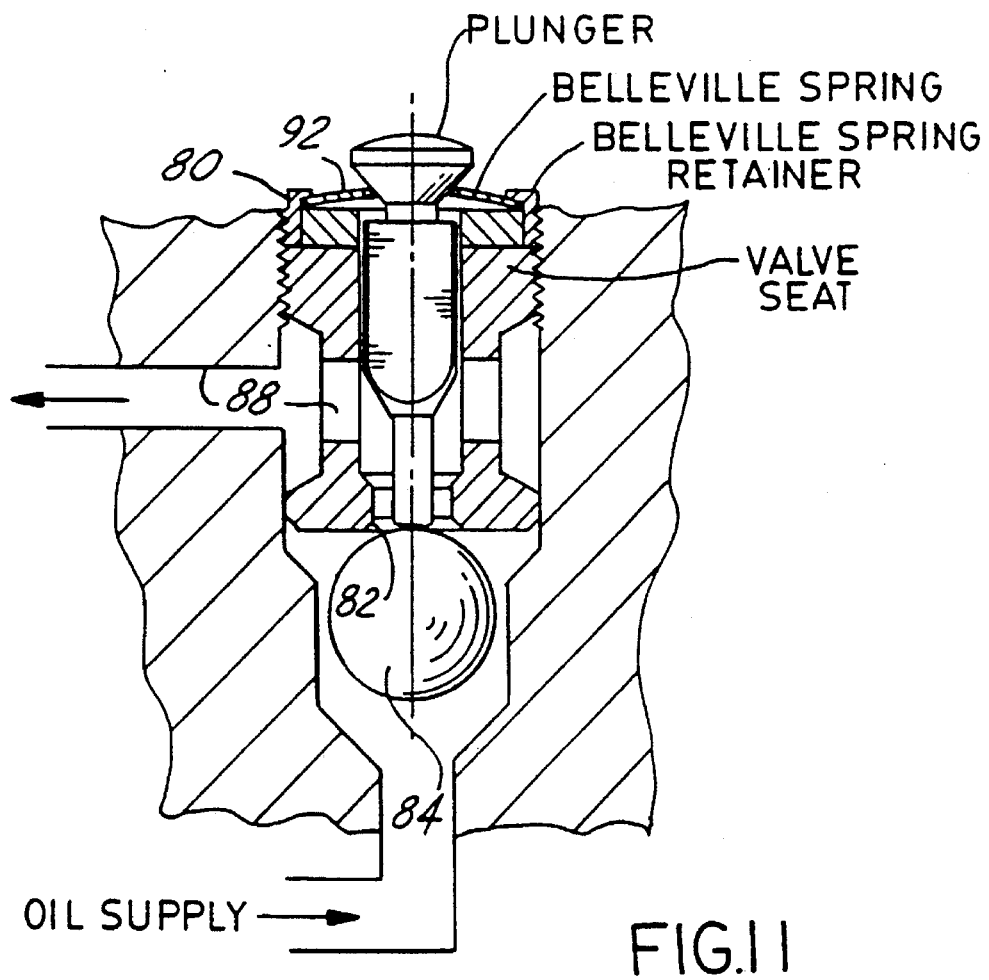
FIG. 11 is a schematic representation of a subassembly of a normally vented solenoid valve assembly in accordance with an embodiment of the present invention.

In FIG. 11, we have shown a damper construction for the plunger of the normally vented version of our invention. The damper comprises a Belleville spring 92 having a central opening that is engaged by the conical surface of the plunger. The central opening forms an exhaust or vent port which is sealed by the plunger when the plunger is moved downwardly by the armature 68.

The outer margin of the Belleville spring is anchored to the housing 80. Any noise or vibration caused by the engagement of the plunger with the port provided by the Belleville spring is eliminated as the Belleville spring yields following sealing engagement of the plunger with the central opening of the Belleville spring.

As the plunger moves downwardly, it engages the ball 84, thereby unseating the ball from the ball valve seat 82 and allowing pressure distribution to passage 88.

Although the various noise and vibration reduction mechanisms in accordance with the present invention are described herein with respect to pulsewidth modulated solenoid-operated valve assemblies and more particularly to pressure regulated valve assemblies for automatic transmission systems, it should be understood that the present invention has application in solenoid-operated valve assemblies of virtually any type and purpose. For example, the present invention can be used with solenoid-operated purge valves, solenoid-operated idle speed control valves, and the like.

Other mechanisms using Belleville springs or other resilient members to reduce the noise of solenoid-operated valve devices are shown in FIGS. 12–16. These mechanisms utilize a resilient member or mechanism at the free end of the armature which engages the valve plunger.

As shown in FIG. 12, the armature 118 has a cylindrical offset portion 118' which is arranged in alignment with the solenoid core 12 in the same manner as discussed above with reference with FIG. 1. The free end 119 of armature 118 has a resilient mechanism 120 attached to it. The resilient mechanism 120 is adapted to make contact with plunger 24 in the valve assembly. The valve assembly can be any of the normally applied or normally vented valve assemblies described above and shown in the other Figures of the drawings.

FIG. 12A is an enlarged view of the end 119 of the armature 18 and the resilient mechanism 120. As shown, pin 122 is slidingly positioned in opening 124 in the end of the armature. The pin 122 has a flange or head 126 which acts as a seat for a Belleville spring 128. The other end of pin 122 is held in place on the armature 118 by a retainer member or locking member 130. The member 130 fits within a groove in the pin 122 or under an enlarged flange member 132 as shown. Alternately, a spring clip or other standard snap-on device could be used to hold the pin 122 in the armature.

Belleville spring 128 provides a cushioning force whenever the armature 118 activated by the solenoid is forced into engagement with the plunger 24. This significantly reduces the peak impact forces and secures a corresponding reduction in the noise.

FIGS. 13 and 14 show alternate embodiments to a Belleville spring-type resilient mechanism on the end of armature 118. In FIG. 13, the head 126 of pin 122 is biased by O-ring 134. In FIG. 14, the pin 122 is biased by coil spring member 136.

FIGS. 15 and 16 shown two other alternative resilient mechanisms for attachment to the end 119 of armature 118. In FIG. 15, a Belleville spring 140 is held in place on the armature 118 by adjustable set screw 142 and positioned to rest lightly on the upper surface 144 of plunger 24. A slot 146 is used to adjust the set screw 142 relative to the armature 118. The set screw is received in threaded bore 148 in the armature.

In FIG. 16, a Belleville spring 150 is positioned in recess 152 in the armature 118. The spring 150 biases the hardened insert 154 which is positioned in retainer member 156. The retainer member 156 is held in recess 152 in a press fit relationship. The lower end 160 of insert 154 is adapted to make contact with the plunger 24.

It is understood that the armature embodiments shown in FIGS. 12–16 can be used with either normally applied or normally vented solenoid-operated valve assemblies. Also, armature members 118 with resilient mechanisms thereon can be used as an alternative to the Belleville spring-type embodiments of the invention shown in FIGS. 2–3, 7–9 and 11, or can be used in combination with such Belleville spring-type mechanisms. The alternate embodiments shown in FIGS. 12–16 when used independently of the Belleville spring-type embodiments should provide a satisfactory vibration and noise reduction in a solenoid-operated valve assembly. If the two systems were utilized in combination, the resultant noise vibration reduction should be even greater.

Other alternate mechanisms for reducing the noise in solenoid-operated valve assemblies are shown in FIGS. 17–24. These embodiments utilize many parts and features that are the same as or similar to the structures and features described above and thus are referred to by the same reference numerals. For example, the embodiments shown in FIGS. 17, 18, 20 and 21 include a solenoid core 12 with a surrounding coil winding 16. The core and windings are positioned in a magnetic shunt 14 and an outer housing. Armature 18 is pivoted at point 20 on the shunt 14. A cylindrically offset portion 18' on the armature is arranged in alignment with the solenoid core 12. A stop 21 for the upward movement of the armature is contained on the inside of the housing.

The free end of the armature 18 engages a plunger 24 that is received in an opening in a valve member 26. The plunger 24 is adapted to engage a ball valve element 28 which registers with a lower valve member 30. When the solenoid is energized, the armature is pulled toward the core. The free end of the armature then makes contact with the upper end of the plunger operating the valve assembly.

Figure 17:
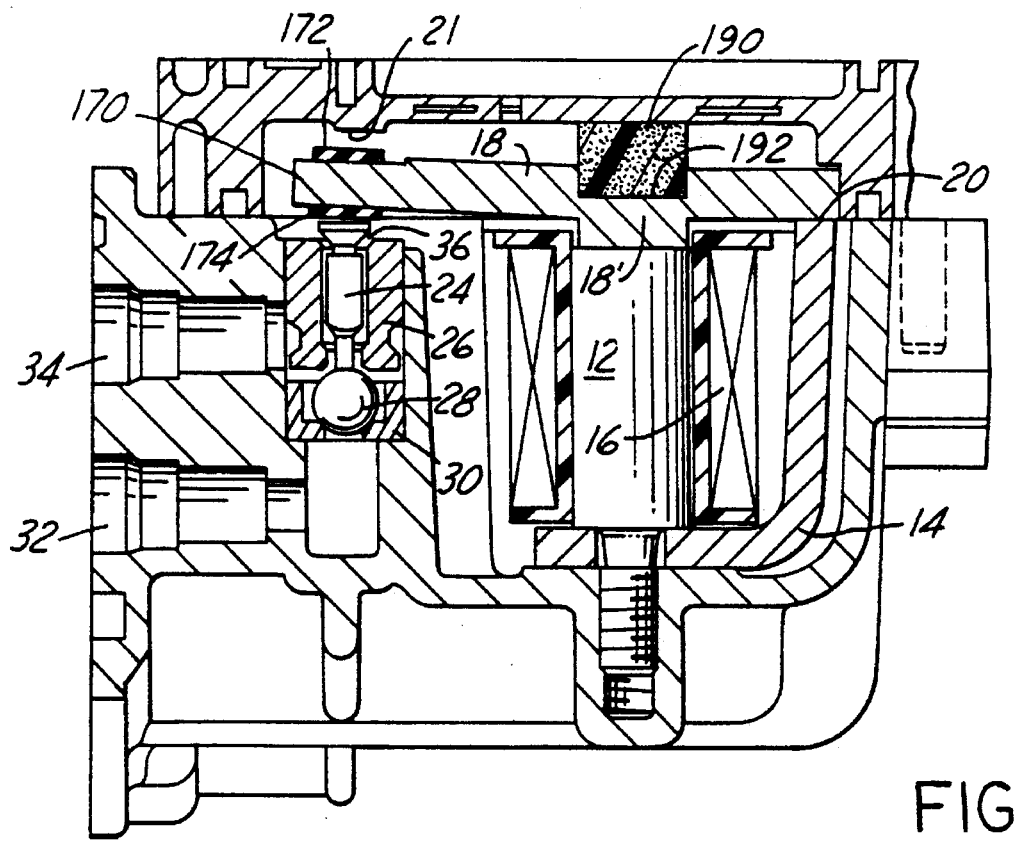
FIG. 17 illustrates use of a foam cushion and alternate resilient armature member in accordance with another embodiment of the present invention when utilized with a normally applied valve assembly.
Figure 18:
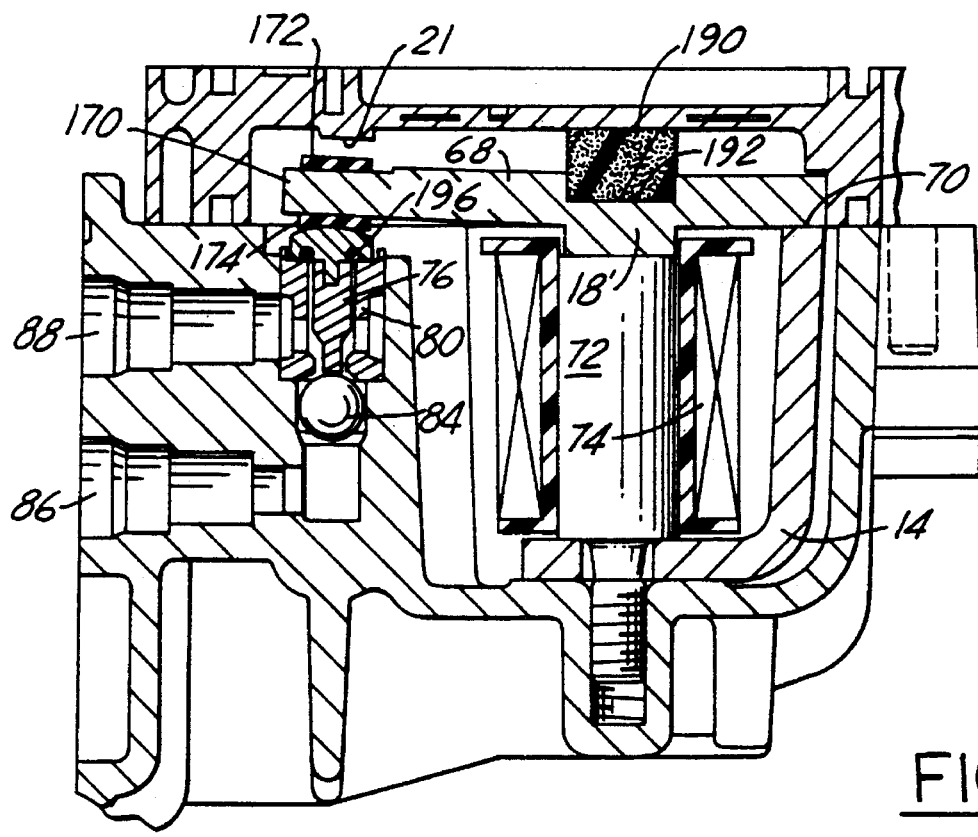
FIG. 18 illustrates use of a foam cushion, alternate resilient armature member, and alternate resilient sealing member for the valve plunger in accordance with a normally vented valve assembly in accordance with the present invention.

In FIG. 17, a normally applied solenoid valve assembly is shown, while FIG. 18 shows a normally vented solenoid valve assembly. In both embodiments, the end 170 of the armature 18 has a pair of resilient pads or members 172 and 174 attached thereto. These resilient pads 172 and 174 cushion the contact of the armature with stop 21 and plunger 24 thus reducing any noise caused by those contacts.

The resilient pads 172 and 174 preferably are 80 durometer rubber pads which are secured to the end of the armature by glue or other adhesive.

Figure 19A:
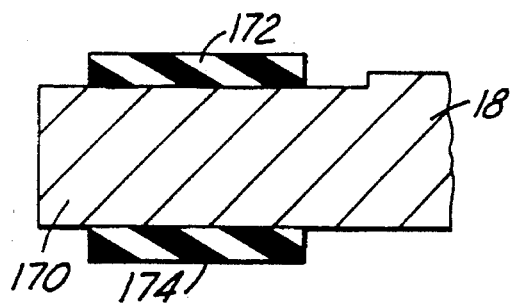
FIGS. 19A–19C illustrate alternative resilient members for the armature in accordance with the present invention.
Figure 19B:
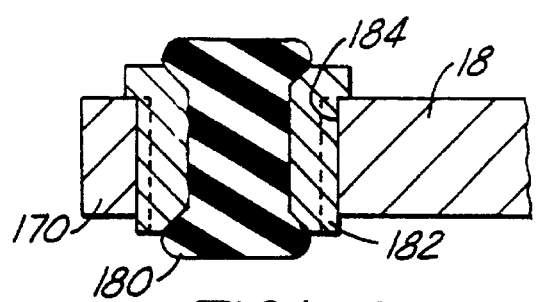
Figure 19C:
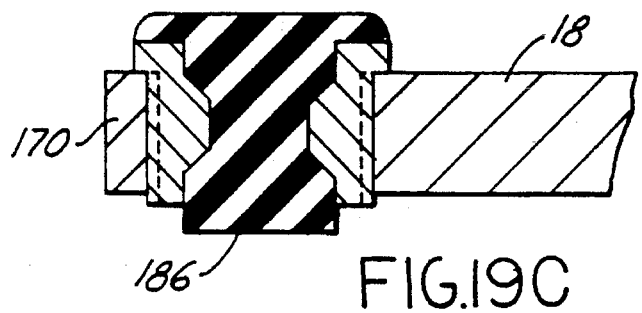

An enlarged view of the resilient pads 172 and 174 secured to the end of the armature is shown in FIG. 19A. FIGS. 19B and 19C show alternate embodiments of positioning resilient members on the end 170 of the armature 18 in order to cushion the contact of the armature with the stop and plunger. In FIG. 19B, a resilient member 180 is molded in an insert 182 which is then screwed into or otherwise secured in opening 184 in the armature 18. In FIG. 19C, an alternate design of a molded resilient member 186 is shown.

A foam cushion member 190 is positioned between the housing and the armature 18 in the systems shown in FIGS. 17 and 18. The cushion member 190 preferably is a piece of closed cell foam that is positioned in or secured to the armature 18 in the recess 192 formed when the offset portion 18' is made in the armature. The foam cushion 190 can be loosely positioned between the armature and housing and held in place by the two members, or it can be glued or otherwise secured to the armature.

The cushion member 190 causes a slight preload on the armature toward the pole piece which maintains contact with the armature at the shunt at one end and with the plunger at the other end. The member 190 reduces the "slapping noise" when the armature momentarily loses contact with the plunger. The cushion 190 also prevents any transmitted vibrational noise from the armature through the housing.

In the normally vented solenoid valve assembly as shown in FIG. 18, an O-ring 196 is positioned under the head of the plunger 76. The O-ring 196 cushions the seating of the plunger in the upper valve member 80 and also acts as a seal closing the vent passageway.

With the embodiment shown in FIG. 18, a reduction in the noise relative to a solenoid activated valve mechanism without the invention is approximately 50%. (In decibels, the noise reduction is approximately 6–8 dB.) In the embodiment shown in FIG. 17, the noise reduction is approximately 4–5 dB.

Figure 20:
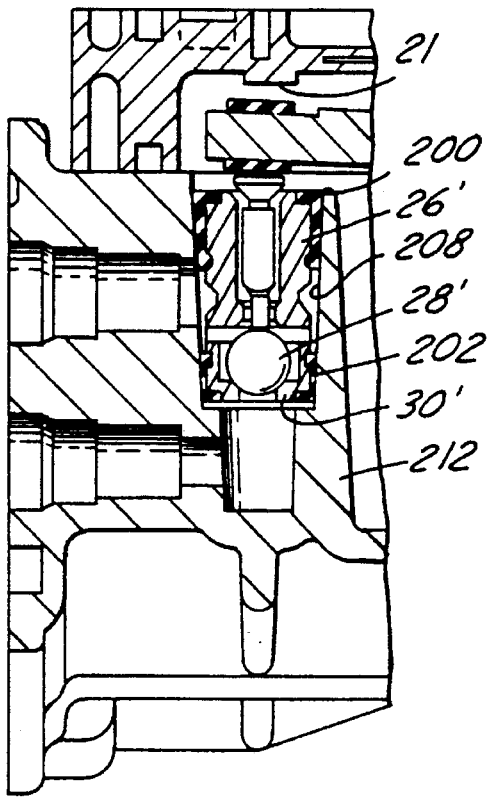
FIGS. 20 and 21 illustrate a normally applied valve assembly and a normally vented valve assembly, respectively, utilizing still another embodiment of the invention.
Figure 21:
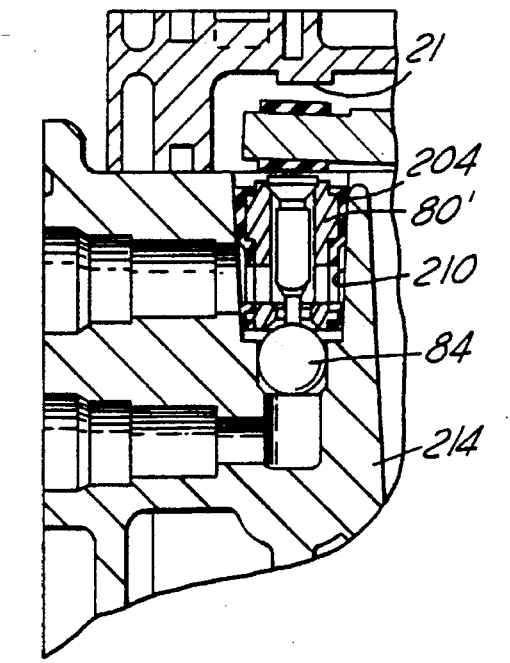

FIGS. 20 and 21 illustrate additional embodiments for reducing the noise of a solenoid-activated valve assembly. FIG. 20 illustrates a normally applied solenoid valve mechanism, while FIG. 21 illustrates a normally vented solenoid valve mechanism. Each of these systems are shown with the solenoid being energized.

In FIGS. 20 and 21, the valve seats are isolated by resilient cushion members 200, 202 and 204. The cushion members are preferably made from a rubber or elastomeric material, but can be made of any comparable material. These cushioning members are molded on the outer surfaces of the valve seat members 26', 30' and 80', respectively. In addition, the bores 208 and 210 in housings 212 and 214, respectively, are tapered. The tapers are approximately 2° per side. The outer surfaces of the resilient molded cushion members 200–204 are tapered in order to mate with the tapered bores 208 and 210.

Tapering of the housing and resilient cushioning members allows for proper hydraulic sealing by creating an interference between the valve seat and the housing seat bores. Additionally, the tapered molded cushion members allow for compliance in shear during the energizing impact caused by the armature on the plunger. As a result, the tapered resilient cushion members serve the purposes of sealing, isolating the valve seats in the housing, and compliance in shear.

Figure 22:
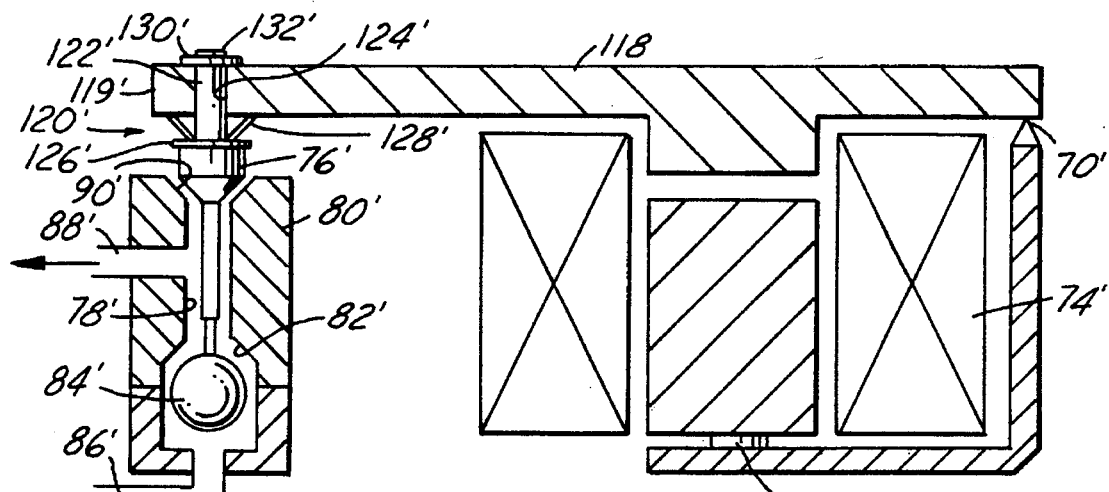
FIGS. 22–24 illustrate alternate embodiments of valve assemblies in accordance with the present invention.
Figure 23:
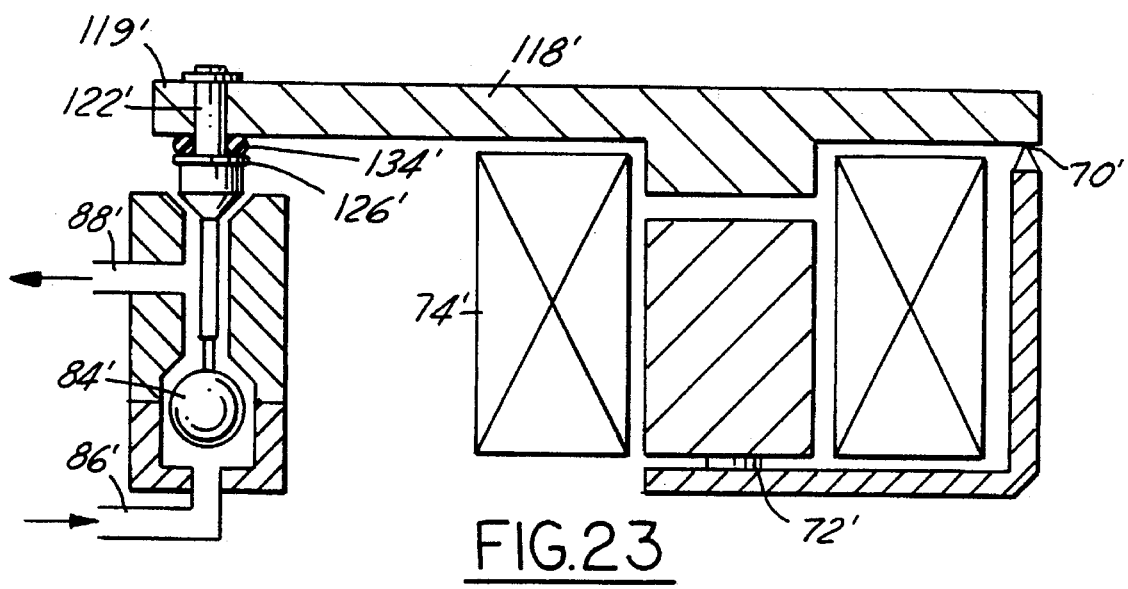
Figure 24:
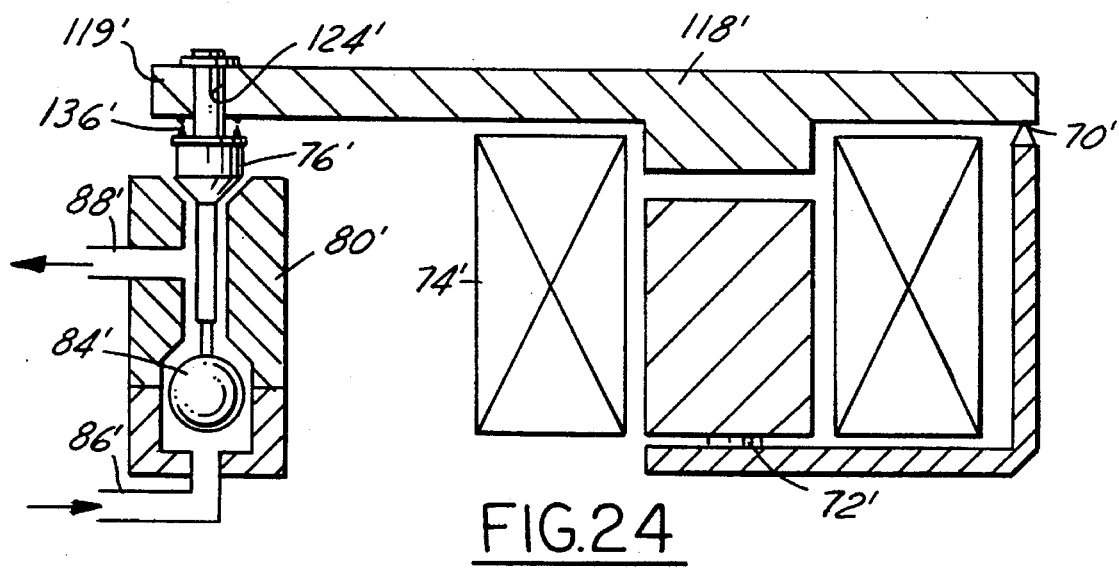

FIGS. 22-24 illustrate three alternate embodiments of valve assemblies in accordance with the present invention. These embodiments combine the subject matter of FIG. 10 with the armatures shown in FIGS. 12A, 13 and 14.

Although particular embodiments of the present invention have been illustrated in the accompanying drawings and described in the foregoing detailed description, it is to be understood that the present invention is not to be limited to just the embodiments disclosed, but that they are capable of numerous rearrangements, modifications and substitutions without departing from the scope of the claims hereafter.

We claim:

1. A solenoid valve assembly comprising a core member, a coil surrounding said core, a valve mechanism and an armature member having two ends, a first end positioned adjacent said core and a second end in operational relationship with said valve mechanism, said second end having a Belleville spring resilient member positioned thereon for reducing the impact force on said valve mechanism.

2. The valve assembly as set forth in claim 1 wherein said valve mechanism comprises a plunger member and a mating valve seat, and a second resilient member is positioned on said plunger member where it mates with said valve seat.

3. The valve assembly as set forth in claim 2 wherein said second resilient member is an O-ring.

4. A solenoid valve assembly comprising a core member, a coil surrounding said core, a valve mechanism and an armature member having two ends, a first end positioned adjacent said core and a second end in operational relationship with said valve mechanism, said second end having an O-ring resilient member positioned thereon for reducing the impact force on said valve mechanism.

5. A solenoid valve assembly comprising a core member, a coil surrounding said core, a valve mechanism and an armature member having two ends, a first end positioned adjacent said core and a second end in operational relationship with said valve mechanism, said second end having a coil spring resilient member positioned thereon for reducing the impact force on said valve mechanism.

6. A solenoid valve assembly comprising a core member, a coil surrounding said core, a valve mechanism and an armature member having two ends, a first end positioned adjacent said core and a second end in operational relationship with said valve mechanism, said second end having a resilient member positioned thereon for reducing the impact force on said valve mechanism, said resilient member being adjustable relative to said armature.

7. A solenoid valve assembly comprising a core member, a coil surrounding said core, a valve mechanism and an armature member having two ends, a first end positioned adjacent said core and a second end in operational relationship with said valve mechanism, said second end having a resilient member positioned thereon for reducing the impact force on said valve mechanism, said valve mechanism having at least one valve seat member slidingly positioned in a bore, said valve seat member having resilient means for mating with said bore, and said bore having a tapered configuration.

* * * * *